Aug. 18, 1931.   P. T. SNYDER   1,819,391
ENGINE STARTER
Filed July 7, 1928   2 Sheets-Sheet 1
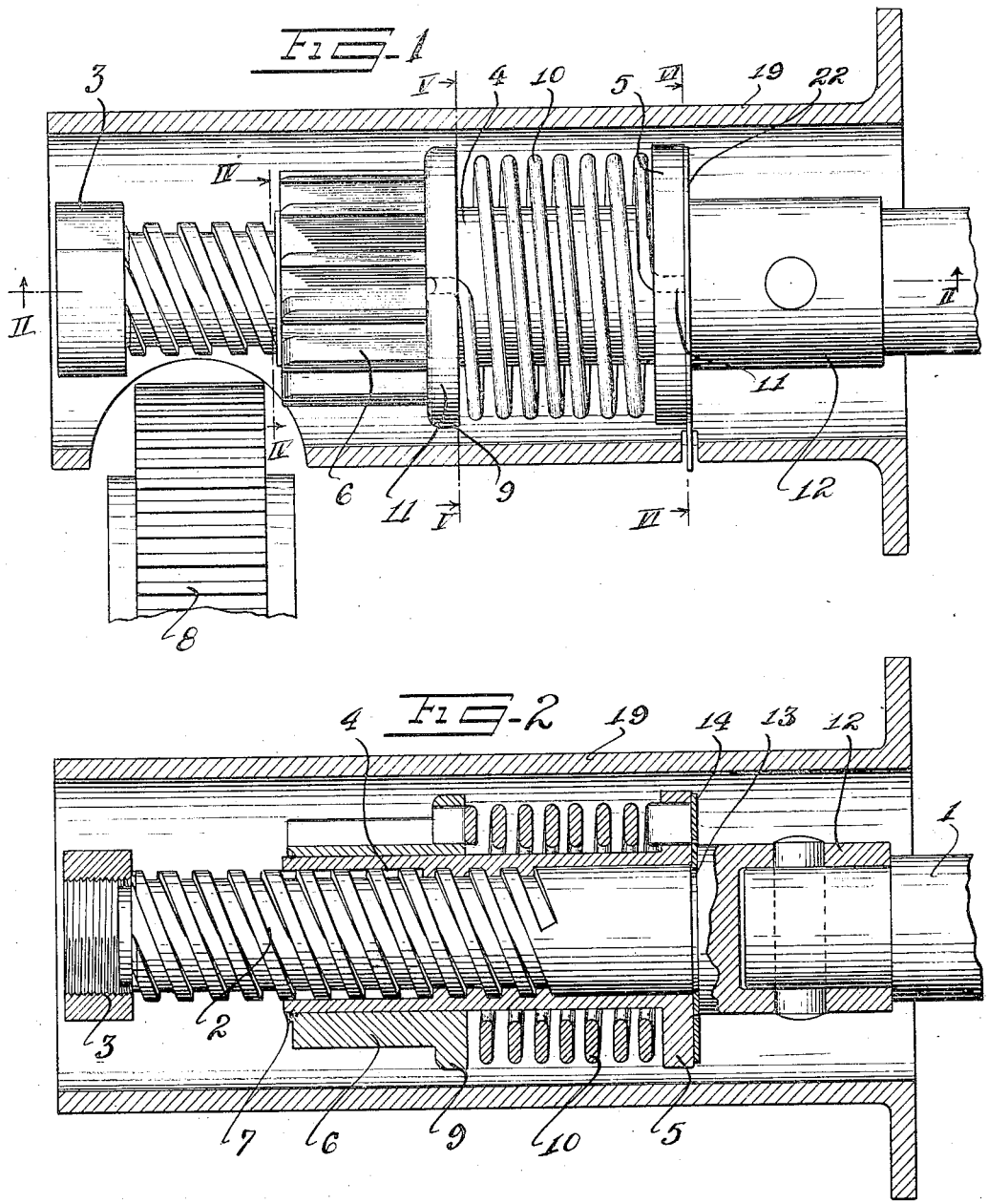
Inventor
Parke T. Snyder
by Charles Mill
Attys

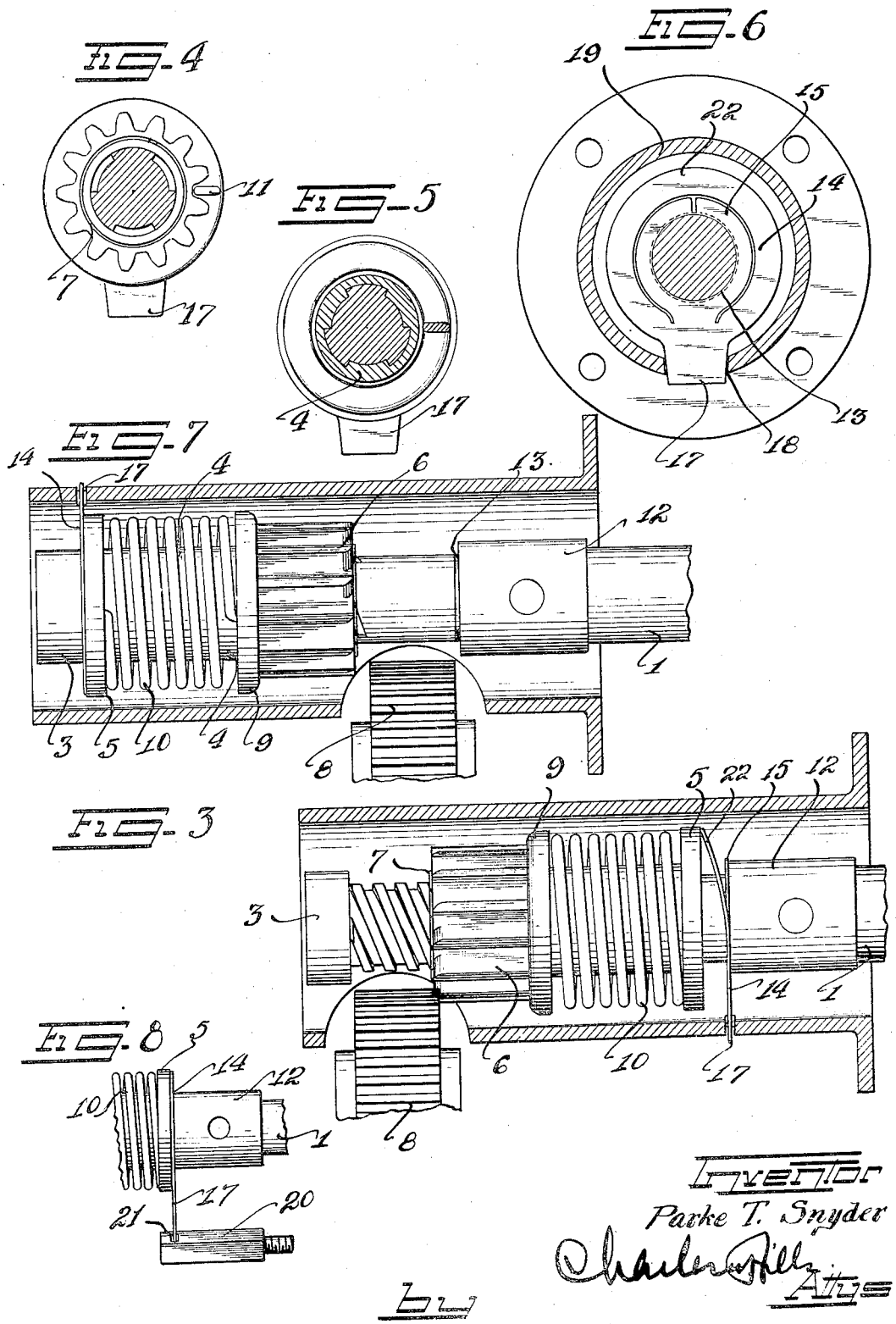

Patented Aug. 18, 1931

1,819,391

UNITED STATES PATENT OFFICE

PARKE T. SNYDER, OF CHICAGO, ILLINOIS, ASSIGNOR TO VINCENT BENDIX, OF CHICAGO, ILLINOIS

ENGINE STARTER

Application filed July 7, 1928. Serial No. 291,105.

This invention relates to an engine starter of that type involving a driven member that automatically moves into engagement with an engine member when the motor starts and that automatically disengages when the engine runs under its own power.

It is an object of this invention to provide an improved starter of the above mentioned type in the elimination of counterweights and the addition of friction means in place of the usual counter weights and which friction means also prevents longitudinal creeping of the driven member and cushions the same when moved to normal or inoperative position.

It is a further object of this invention to provide for sufficient longitudinal yielding movements of the driven member in case there is an abutting relation between the driven member and the engine member.

The invention comprises the novel structure and combination of parts hereinafter described and more particularly pointed out and defined in the appended claims.
In the accompanying drawings which illustrate a preferred embodiment of this invention and in which similar reference numerals refer to similar features in the different views:
Figure 1 is a sectional view through the starter casing, showing the starter and engine motor in elevation.

Figure 2 is a longitudinal sectional view through the engine starter, taken upon the line II—II of Figure 1.

Figure 3 is a view similar to Figure 1, illustrating the longitudinal movement of the driven member.

Figure 4 is a sectional view upon Figure 1, looking in the direction of the arrow.

Figure 5 is a sectional view taken upon the line V—V of Figure 1.

Figure 6 is a sectional view upon the line VI—VI of Figure 1.
Figure 7 is a view similar to Figure 1, showing a modified form of starter in which the driven member travels in a reverse direction.

Figure 8 is a fragmentary detail view of a modified feature of the invention.
In the drawings there is shown a driving member 1 which may constitute a motor shaft or a shaft driven by the starting motor. The shaft 1 is provided with helical threads 2 and an abutment 3 at the front end thereof. The abutment 3 is preferably in the form of a nut threaded upon the end of the shaft. An internally threaded sleeve 4 is threaded upon the shaft 1. The sleeve 4 has an integral collar 5 upon the rear end thereof which serves as an abutment. Upon the forward end of the sleeve 4 is freely mounted a driving member 6 which in the present instance is shown as a pinion. At the forward end the sleeve 4 is provided with a groove for receiving a split ring 7 for providing an abutment for preventing the pinion 6 from sliding off the forward end of the sleeve. It will be noted that the outer periphery of the sleeve 4 is perfectly smooth in order that the pinion 6 may slide thereon and move out of any tooth on tooth engagement with the engine member represented by the reference numeral 8. The pinion 6 is provided with a collar 9 upon one end and this collar 9 is connected with the abutment 5 by a helical compression spring 10. It will be noted that the ends of the compression spring 10 fit in slots in the collars 5 and 9 as indicated at 11 in Figure 1.

The shaft 1 is provided with a collar 12 which serves as an abutment rearward of the threaded portion 2. In the present instance the shaft 1 is shown as made of two sections. The threaded portion is shown as made of a separate section having a suitable socket for receiving the reduced end of the other section thereof and this collar 12 constitutes the socket end of said threaded section. The forward end of the collar or abutment 12 has an annular shoulder and closely adjacent this shoulder there is a groove 13 which is clearly shown in Figure 2. A leaf spring 14 provided with an arcuate cut out tongue 15 is confined in the groove 13. With reference to Figure 6 it will be noted that the tongue 15 is in the form of a split ring which can be readily snapped in the groove 13. The spring 14 terminates in an extension 17 which is adapted to be suitably anchored against movement. The extension 17 may extend through a slot 18 in a casing 19 that may be used to house the starter. If no casing is used, a suitable stud 20 as shown in Figure 8 may be secured to any suitable part of the vehicle. The stud 20 is shown as provided with a slot 21 for confining the anchoring extension 17 against radial or longitudinal movement. An arcuate or substantially circular portion 22 surrounds the split ring portion 15 of the spring. The circular portion 22 is normally bent forward as shown in Figure 3 and a predetermined amount of force is required to flex the same into the plane of the split ring portion 15 as shown in Figures 1 and 2. This portion 22 will cushion the sleeve 4 when it travels rearwardly into its normal or inoperative position against the abutment 12 and provides for a slow start of the driving shaft. That is, a quick start of the driving shaft is not necessary.

In the form of the invention shown in Figures 1 and 2 the driving member 6 is adapted to travel forwardly into engagement with the tooth engine member 8. In some instances it may be desired that the driven member 6 travel in the reverse direction and in Figure 7 there is shown a modification in which the pinion 6 travels in such reverse direction. In this modified form certain parts are shown in reverse position. Thus the spring 14 is confined against the nut 3 and tends to force the sleeve 4 in the opposite direction from that shown in Figures 1 and 2, and against the abutment 12 adjacent which there is a groove 13 for receiving the spring 14 in case it is desired to reverse the parts to the position shown in Figure 1.

It will be noted that the leaf spring 14 is straightened out by the collar 5 of sleeve 4 when the same is in its normal or inoperative position. There is hence considerable friction between these parts that is sufficient to prevent or retard the rotation of sleeve 4 when the shaft 1 starts its rotation. Therefore, if shaft 1 is rotated in the proper direction, it will rotate relative to the sleeve 4 which will be caused to travel longitudinally to bring the pinion 6 into meshing relation with the engine member 8. During this movement, the spring 14 pressing upon sleeve 4 will tend to advance or move the same longitudinally as shown in Figure 3. Continual rotation will of course cause the sleeve 4 to travel into engagement with the abutment 3. Due to the frictional engagement between the spring 14 and collar 4, only a slow rotation of the starting motor shaft is required.

If the pinion 6 should not properly aline with the engine gear 8 for meshing relation, but on the contrary an abutting tooth on tooth relation is established, the spring 10 will be compressed a sufficient extent to prevent any injurious results. That is, upon tooth on tooth engagement, the pinion 6 will travel rearwardly upon the sleeve 4 and compress the spring 10 while the shaft 1 moves forwardly. In connection therewith, it will be obvious that the location of the starting motor and the starter in a vehicle does not govern or restrict the length of sleeve 4 that might be used. It is therefore possible in this improved structure to employ a sleeve 4 of sufficient length in combination with a suitable spring 10 to provide a suitable relief travel for the pinion 6 when a tooth on tooth engagement occurs with the engine gear. When the engine starts under its own power, the sleeve 4 will travel toward its normal or inoperative position against the outer circular portion 22 of the spring 14 which acts as a cushion and when the sleeve 4 is arrested by the abutment 12 it will be frictionally locked against creeping by the spring 14.

From the foregoing it will be apparent that an improved starting mechanism has been provided which eliminates the objectionable features of engine starters of this type now in use. For it is well known that many starters of this type now in use do not provide for sufficient safety travel of the pinion 6 when there is a tooth on tooth engagement. It is also well known that many starters now in use lack effective means for preventing the driven pinion from creeping and for causing relative longitudinal movement of the driving and driven member. These defects are overcome by this invention.

It will also be appreciated that the starter may be completely assembled upon the forward section of the shaft 1 before such section is coupled to the other section thereof. It is therefore possible to ship and transport a complete assembly for coupling relation with the motor or driving shaft. It is further evident that the mechanism of the starter is very simple and can be readily made and assembled and especially in view of the fact that it contains fewer parts than similar starters now on the market.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an engine starter comprising a shaft, a sleeve having a threaded connection with said shaft, said sleeve having opposed abutments, a pinion slidably mounted between said abutments and having a yielding connection with one of said abutments and a leaf spring anchored against rotation and normally bearing against one of said abutments for the purpose set forth.

2. In an engine starter, a shaft, a sleeve having opposed abutments threaded upon said shaft, a pinion slidably mounted upon said sleeve between said abutments and having a yielding connection with one of said abutments, a collar upon said shaft, said shaft having a groove adjacent said collar, a leaf spring having a split ring portion seated in said groove and having a portion bearing against said sleeve, and means for anchoring said leaf spring against rotation.

3. In an engine starter including a threaded shaft, a sleeve on said shaft, a pinion on said sleeve and yieldably connected thereto, and a leaf spring anchored to said shaft and having a forwardly extending portion engaging said sleeve, said forwardly extending portion being adapted when pressed rearwardly by said sleeve to frictionally retain the said sleeve against creeping.

4. In an engine starter comprising a shaft, a sleeve threaded on said shaft, a driving pinion on said sleeve, a yielding device pressing against the rear end of said sleeve for initially advancing the same upon rotation of said shaft, and frictionally retaining the same against creeping when compressed by said sleeve, and means for anchoring said device against rotation.

In testimony whereof I have hereunto subscribed my name at Chicago, Cook County, Illinois.

PARKE T. SNYDER.